United States Patent
Bari et al.

(10) Patent No.: US 11,195,135 B2
(45) Date of Patent: Dec. 7, 2021

(54) SYSTEMS AND METHODS FOR RANKING ENTITIES

(71) Applicant: Refinitiv US Organization LLC, New York, NY (US)

(72) Inventors: Omar Bari, Boston, MA (US); Alex Constandache, Waltham, MA (US); Laura Gaze Morse, Clinton, CT (US); Emily Lyons, Chappaqua, NY (US); Michael Moore, Stamford, CT (US); Corey Ouellette, Kitchener (CA); Brian Romer, Salem, MA (US); Shraddha Sawardekar, Jersey City, NJ (US); Amit Shavit, Boston, MA (US); Brian Ulicny, Winchester, MA (US)

(73) Assignee: Refinitiv US Organization LLC, New York, NY (US)

( * ) Notice: Subject to any disclaimer, the term of this patent is extended or adjusted under 35 U.S.C. 154(b) by 184 days.

(21) Appl. No.: 16/019,157

(22) Filed: Jun. 26, 2018

(65) Prior Publication Data

US 2019/0012367 A1 Jan. 10, 2019

Related U.S. Application Data

(60) Provisional application No. 62/529,049, filed on Jul. 6, 2017.

(51) Int. Cl.
*G06Q 10/06* (2012.01)
*G06F 17/18* (2006.01)
(Continued)

(52) U.S. Cl.
CPC . *G06Q 10/06393* (2013.01); *G06F 16/24578* (2019.01); *G06F 16/287* (2019.01); *G06F 17/18* (2013.01)

(58) Field of Classification Search
CPC ... G06F 16/287; G06F 16/24578; G06F 17/18
See application file for complete search history.

(56) References Cited

U.S. PATENT DOCUMENTS

| 8,417,713 B1 | 4/2013 | Blair-Goldensohn et al. |
| 2004/0003132 A1 | 1/2004 | Stanley et al. |
| (Continued) | | |

FOREIGN PATENT DOCUMENTS

WO    2014182725 A1    11/2014

OTHER PUBLICATIONS

Zhang, et al., "A Probabilistic Graphical Model for Brand Reputation Assessment in Social Networks", Aug. 2013, 2013 IEEE/ACM International Conference on Advances in Social Networks Analysis and Mining (ASONAM'13) (Year: 2013).*

(Continued)

*Primary Examiner* — Matthew Ell
*Assistant Examiner* — Anugeetha Kunjithapatham
(74) *Attorney, Agent, or Firm* — McCarter & English, LLP

(57) ABSTRACT

Described herein are systems and methods for an entity ranking system. In one embodiment, a computing system is configured to interface with one or more domains to identify a set of entities. The computing system can ascertain a first set of data components for each entity, normalize each of the first set of data components for each entity, and detect a failure to ascertain a second set of data components. The computing system can compute a statistical probability for a possible set of values for each data component of the second set based on the ascertained first set of data components. The computing system can rank each entity based on a derived quantile. The computing system can generate a graphical (Continued)

user interface including a visualization of the ranking of each entity, which can be rendered on a display of the at least one user computing devices.

20 Claims, 11 Drawing Sheets

(51) Int. Cl.
   *G06F 16/28* (2019.01)
   *G06F 16/2457* (2019.01)

(56) References Cited

U.S. PATENT DOCUMENTS

| | | |
|---|---|---|
| 2008/0256031 A1 | 10/2008 | Chen et al. |
| 2012/0158632 A1 | 6/2012 | Grenier et al. |
| 2015/0149247 A1* | 5/2015 | Kramskaia .............. G06N 5/04 705/7.31 |
| 2015/0161636 A1* | 6/2015 | Williams ........... G06Q 30/0206 705/7.35 |
| 2015/0356574 A1* | 12/2015 | Ballew .................. G06Q 40/00 705/7.29 |
| 2016/0162582 A1* | 6/2016 | Chatterjee ........... G06F 16/9535 707/706 |

OTHER PUBLICATIONS

Frank Wood, "A Bayesian Treatment of Linear Gaussian Regression", Dec. 2009 (Year: 2009).*

International Search Report and Written Opinion from International Patent Application No. PCT/US2018/039557 dated Sep. 18, 2018.

Extended European Search Report from related European patent application No. 18827657.0 dated Dec. 16, 2020.

* cited by examiner

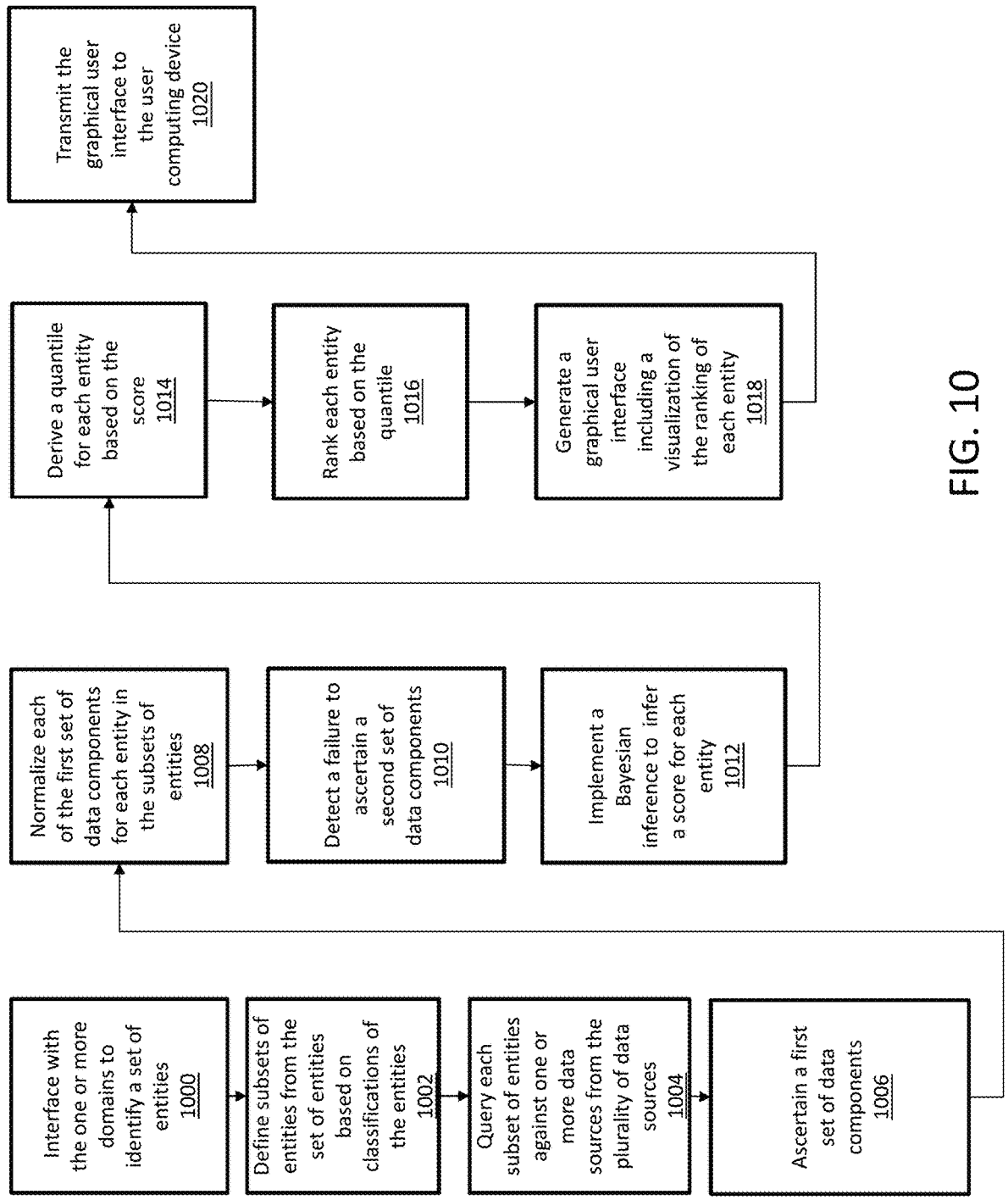

SYSTEMS AND METHODS FOR RANKING ENTITIES

CROSS-REFERENCE TO RELATED PATENT APPLICATIONS

This application claims priority to U.S. Provisional Application No. 62/529,049 filed on Jul. 6, 2017, the content of which is hereby incorporated by reference in its entirety.

BACKGROUND

Ranking entities based on quantitative characteristics from various data sources presents several technical problems, including for example, objectiveness, rigor, and repeatability. The problem is compounded when data associated with some of the quantitative characteristics is available for some of the entities being ranked, but is missing or unavailable for other entities.

SUMMARY

Embodiments of the disclosed systems and methods provide a novel approach to assessing entities within a selected or targeted industry vertical.

Embodiments of the disclosed systems and methods use a unique combination of Bayesian logic and analysis on data sets comprising, for example, financial, environmental, legal and other data assets, in conjunction with a weighting system, which collectively produce a ranked order of entities to indicate their leadership within a classification (i.e., industry).

For each entity, data for the following pillars and/or categories can be extracted: financial performance, management & investment confidence, innovation, legal compliance, environmental impact, people & social responsibility, reputation, and risk & resilience. The financial pillar and/or category can include the following feature components: Asset Worth, Free Cash Flow per Employee, Leverage, Operating Income Margin, 3-Year Revenue Growth, and Return on Invested Capital. The management & investment confidence pillar and/or category can include the following feature components: CAM Sector, CCR Sector, management score, and shareholders score. The innovation pillar and/or category can include the following feature components: average patents granted per year, patent grants to application ratio, R&D spending, and innovation score. The legal compliance pillar and/or category can include the following feature components: average litigations per year and product responsibility score. The environmental impact pillar and/or category can include the following feature components: emissions score, and resource use score. The people & social responsibility pillar and/or category can include the following feature components: community score, CSR strategy score, human rights score, and workforce score. The reputation pillar and/or category can include the following feature components: overall news sentiment score and controversies score. The risk & resilience pillar and/or category can include the following feature components: geopolitical risk, number of customers, number of suppliers, and supply-chain risk. While exemplary pillars and/or categories are described herein, exemplary embodiments can utilize more pillars and/or categories, fewer pillars and/or categories, and/or different pillars and/or categories. The data for the pillars and/or categories can be combined and input within a Bayesian model to calculate a final score for each entity. This corresponds the ranking of the entity within said industry. The Bayesian model can employ Bayesian inference, which is a method of statistical inference that uses Bayes theorem to compute joint probability distributions of parameters in statistical models, conditional on observed empirical evidence.

Embodiments of the disclosed systems and methods provide an objective, scientific and repeatable method to assess entities within a given sector or region and identify their leadership position therein. Furthermore, embodiments of the disclosed systems and methods can use a unique methodology to rank entities or organizations and their leadership potential. The methodology can be rooted in metrics and data assets from across one or more data sources, such as one or more proprietary data sources from Thomson Reuters®. As an example the data sources can be multiple databases, including a fundamentals database, a StarMine® & Broker Estimates database, a Country Risk Ranking database, a Value Chains database, a Monitor Suite™ database, an Environment, Social, Governance (ESG) database, and a news analytics database. Additionally, embodiments of the disclosed systems and methods can handle missing data using Bayesian analysis while making minimal assumptions about the underlying data (e.g., does not assume the data need to be normally distributed). Embodiments of the disclosed systems and methods can be insensitive to correlations among the input data dimensions so that datasets can contribute to the scoring without first having to determine whether they are orthogonal to other datasets.

In accordance with embodiments of the present disclosure, a computing system is in communication with one or more domains, data sources, and user computing devices in a networked environment. The data sources can store one or more databases associated with entities. The computing system can host an application and can be configured to interface with the one or more domains to identify a set of entities based on a taxonomy and a registry associated with the entities in the set. The computing system can also define subsets of entities from the set of entities based on classifications of the entities in the set, and query each subset of entities against the one or more data sources. In response to querying the subset of entities against the one or more data sources, the computing system is further configured to ascertain a first set of data components for each entity in the subsets of entities from the one or more data sources, normalize each of the first set of data components for each entity in the subsets of entities, and detect that a second set of data components which were not ascertained (e.g., the components were missing or unavailable). The computing system is further configured to implement a Bayesian inference to infer a score for each entity by: computing a statistical probability for a possible set of values for each data component of the second set of data components based on the ascertained first set of data components, identifying, for each data component in the second set, a value from the possible set of values with the highest statistical probability, and generating the score for each entity in each of the subset of entities based on normalized values of the first set of data and identified values of the second set of data. The computing system can derive a quantile for each entity based on the score, and can rank each entity based on the quantile. The computing system is further configured to generate a graphical user interface including a visualization of the ranking of each entity and transmit the graphical user interface to at least one of the user computing devices to render the graphical user interface on a display of the at least one of the user computing devices.

The computing system is configured to rank each entity with respect to each other entity in each subset. In one embodiment, the computing system is configured to rank each entity with respect to each other entity within the respective subset. The statistical probability for the possible set of values is computed using Bayesian Regression Model. Weights and/or sensitivities can be inferred from the normalized values of the first set of data components and the values of the second set of data components. The visualization includes one or more of: a pie chart, distribution, lists, and gauge charts.

In accordance with embodiments of the present disclosure, the computing system can be configured to receive an input associated with a selected entity of the set of entities, from the at least one user computing device.

In accordance with embodiments of the present disclosure, the visualization in the graphical user interface can include a first graphical representation of a score associated with the selected entity with respect to each entity in the set of entities and a second graphical representation of the score associated with the selected entity with respect to each entity in the subset of entities which includes the selected entity.

In accordance with embodiments of the present disclosure, in response to determining an amount of data components in the first set of data components for a first entity is less than a threshold amount, the computing system can remove the first entity from the set of entities.

Any combination and permutation of embodiments is envisioned. Other objects and features will become apparent from the following detailed description considered in conjunction with the accompanying drawings.

BRIEF DESCRIPTION OF DRAWINGS

The accompanying figures, which are incorporated in and constitute a part of this specification, illustrate one or more embodiments of the present disclosure and, together with the description, help to explain embodiments of the present disclosure. The embodiments are illustrated by way of example and should not be construed to limit the present disclosure. In the figures:

FIG. 10 is a flowchart illustrating an exemplary process performed in an embodiment of the entity ranking system according to an exemplary embodiment.

DETAILED DESCRIPTION

In accordance with embodiments of the present disclosure, a computing system is in communication with, one or more domains, data sources and user computing devices in a networked environment. The data sources can store one or more databases associated with entities. The computing system can host an application and can be configured to interface with the one or more domains to identify a set of entities based on a taxonomy or a registry associated with the entities in the set. The computing system can define subsets of entities from the set of entities based on classifications of the entities in the set and query each subset of entities against one or more data sources from the plurality of data sources.

In response to querying the subset of entities against the one or more data sources the computing system can ascertain a first set of data components for each entity in the subsets of entities from the one or more data sources, normalize each of the first set of data components for each entity in the subsets of entities, and detect a failure to ascertain a second set of data components. The computing system can implement a Bayesian inference to infer a score for each entity by: computing a statistical probability for a possible set of values for each data component of the second set of data components based on the ascertained first set of data components, identifying, for each data component in the second set, a value from the possible set of values with the highest statistical probability, and generating the score for each entity in each of the subset of entities based on normalized values of the first set of data and identified values of the second set of data. The computing system can derive a quantile for each entity based on the score, and can rank each entity based on the quantile. The computing system can generate a graphical user interface including a visualization of the ranking of each entity, which can be rendered on a display of the at least one user computing devices.

Figure 1:
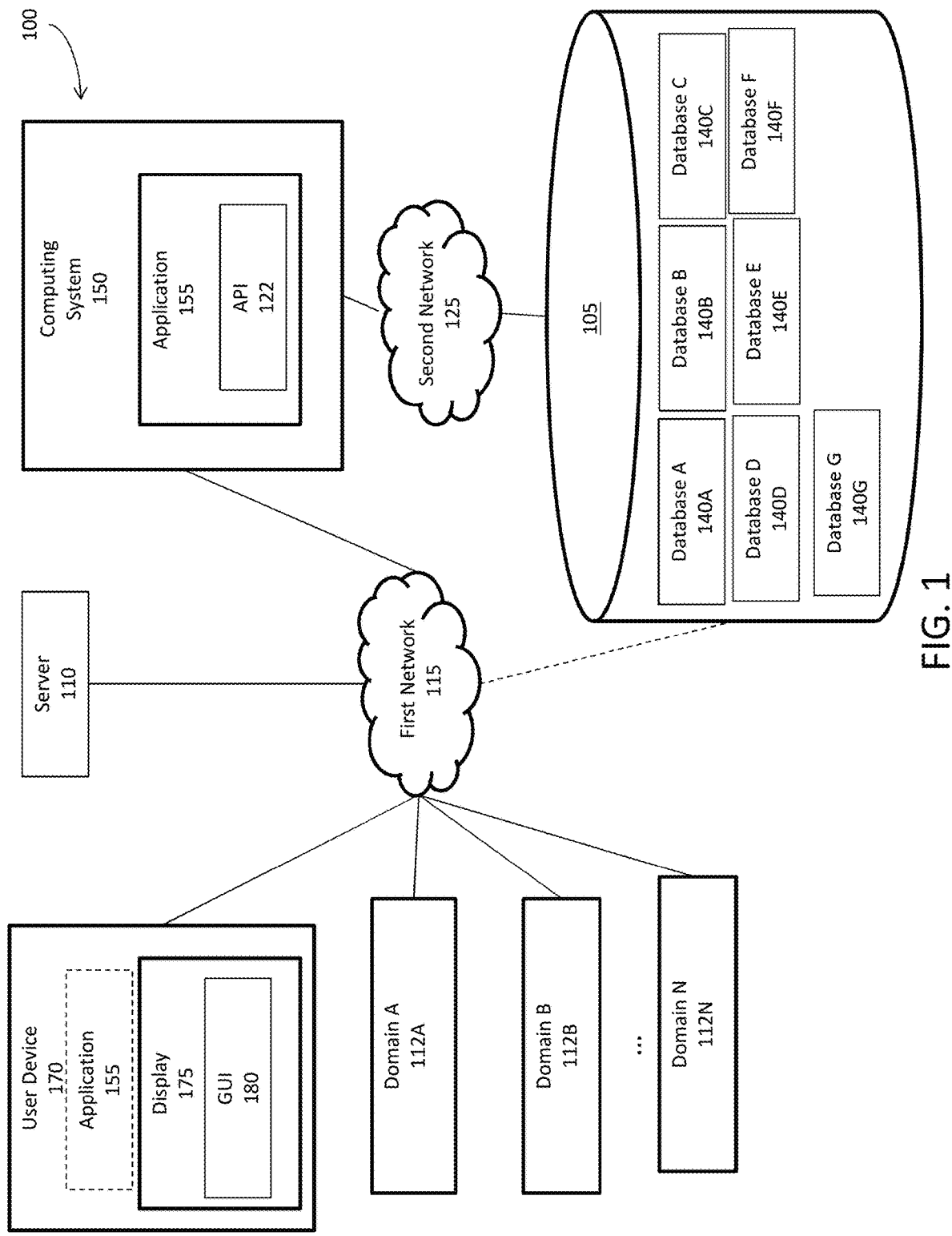
FIG. 1 is network diagram of an entity ranking system in accordance with an exemplary embodiment.

FIG. 1 is network diagram of an entity ranking system 100 in accordance with an exemplary embodiment. The entity ranking system 100 can include one or more data sources 105, one or more servers 110, one or more domains A-N 112*a-n*, one or more computing systems 150, and one or more user devices 170. In exemplary embodiments, the computing system 150 can be in communication with the server(s) 110, the domains A-N 112*a-n*, and the user devices 170, via a first communications network 115. The computing system 150 can be in communication with the data sources 105, via the second communications network 125. In one embodiment, the computing system 150 can be in communication with the data sources 105, via the first communications network 115. The remote computing system 150 can execute an application 155 to implement the entity ranking system 100. The application 155 can include one or more application programming interfaces (APIs) 122 to communicate with the domains 112*a-n* and/or the data sources 105. The one or more user devices 170 can execute an instance of the application 155, hosted by the computing system 150, and/or can interface with the computing system, which can execute an instance of the application on behalf of the one or more user devices 170. The one or more user devices 170 can include a display for rendering a graphical user interface 180.

In an example embodiment, one or more portions of the first and second communications network 115, 125 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 110 includes one or more computers or processors configured to communicate with the computing system 150, domains A-N 112*a-n*, and user devices 170, via the first network 115. The data sources 105 may store information/data, as described herein. For example, the data sources 105 can include multiple databases, including databases A-G 140a-g. The databases A-G 140a-g can include data values from which feature components can be derived and/or calculated. The feature components can be embodied as data components associated with entities, used to calculate a raw score to rank the respective entities. As an example, database A 140a can be embodied as a Fundamentals database, database B 140b can be embodied as a StarMine® & Broker Estimates database, database C 140c can be embodied as a Country Risk Ranking database, database D 140d can be embodied as a Value Chains database, database E 140e can be embodied as a Monitor Suite™ database, database F 140f can be embodied as an Environment, Social, Governance (ESG) database, database G 140g can be embodied as a News Analytics database. One or more of the databases A-G 140a-g can be a proprietary database. The data sources 105 can be located at one or more geographically distributed locations from the computing system 150. Alternatively, the data sources 105 can be located at the same geographic location as the computing system 150.

In one embodiment, the computing system 150 can interface with one or more domains A-N 112a-n to identify a set of entities based on a taxonomy and registry associated with the entities in the set. As an example, one of the domains A-N 112a-n can be embodied as Thomson Reuters Business Classification™ (TRBC) from Thomson Reuters® and another one of the domains a-n 112a-n can be embodied as Thomson Reuters Organization Authority from Thomson Reuters®. The TRBC™ domain can provide entities based on taxonomy of individual sectors associated to the entities. The Thomson Reuters Organization Authority domain can provide a registry of organizations including the entities. The computing system 150 can also interface with the domain A-N 112a-n to retrieve symbology used to reference the entities and demographic metadata associated with each of the entities.

In response to receiving a request, the computing system 150 or one of the user devices 170 can execute the application 155. For embodiments in which the application is executed on the computing system 150, the user device 170 can interface with the application via another application executing on the user device 170 (e.g., a web browser or mobile application). The application 155 can be executed to receive an input associated with one or more entities via the user device 170. The application 155 can be executed to classify each one of the one or more entities and to compile one or more subsets of entities from the set of entities. Each subset of entities can include a universe of entities for each classification. As an example, the application 155 can be executed to compile a first subset of entities including universe of entities for classification A and a second subset of entities an universe of entities for classification B. Each of the one or more entities can be included in the one or more universe of entities for each classification. In one embodiment, the application 155 can be executed to compile a universe of entities for each sub classifications.

The application 155 can be executed to analyze the entities using the data sources 105 and to extract, derive, and/or calculate feature components for each of the entities in each of the subset of entities based on data values extracted from one or more of the data sources 105. As an example, the following pillars and/or categories of feature components can be extracted, derived, and/or calculated: financial performance, management & investment confidence, innovation, legal compliance, environmental impact, people & social responsibility, reputation, and risk & resilience. It can be appreciated that capital structure can also be included as a category and/or pillar. The feature components can be associated with the eight pillars and/or categories, as described above. While exemplary pillars and/or categories are described herein, exemplary embodiments can utilize more pillars and/or categories, fewer pillars and/or categories, and/or different pillars and/or categories.

The financial performance category can be associated with how well an entity is performing financially. The financials category can include one or more of the following feature components: Asset Worth, Free Cash Flow per Employee, Leverage, Operating Income Margin, 3-Year Revenue Growth, and Return on Invested Capital.

The management & investor confidence category can be associated with an amount of confidence of investors with respect to an entity management and risk profile. The investor confidence category can include one or more of the following feature components: CAM Sector, CCR Sector, management score, and shareholders score.

The innovation category can be associated with the innovativeness of the entity. The innovation category can include one or more of the following feature components: average patents granted per year, patent grants to application ratio, R&D spending, and innovation score.

The legal compliance category can be associated with the responsible nature of an entity. The legal compliance category can include one or more of the following feature components: average litigations per year, and product responsibility score.

The environmental impact category can be associated with the environmental sustainability of an entity. The environmental category can include one or more of the following feature components: ESG Emissions Score, and ESG Resource Use Score.

The people & social responsibility category including one or more of the following feature components can also be extracted: Community Score, Workforce Score, Human Rights Score, and CSR Strategy Score.

The reputation category can be associated with the perception of an entity by the public and other stakeholders. The reputation category can be associated with include one or more of the following feature components: Overall News Sentiment, and ESG Controversies Score.

The risk and resilience category can be associated with the operational stability of an entity. The resilience category can be associated with the resiliency of an entity in response to shocks and disruptions. The risk and/or resilience category can include one or more of the following feature components: geopolitical risk, number of customers, number of suppliers, and supply-chain risk.

The application 155 can filter out the entities from each of the subsets, for which the application 155 fails to extract, derive, and/or calculate more than a specified threshold amount of feature components. As a non-limiting example, the application 155 can be executed to extract, derive, and/or calculate at least the following feature components for each entity: Identifier, Company Name, PermID®, and TRBC Industry Group Name.

Database A 140a (e.g., the fundamentals database) can store data values for feature components associated with financials. As an example, the data values in database A 140a can be associated with market cap, net income, 200 day volatility, and long term debt cap. Database B 140b (e.g., the StarMine® & Broker Estimates database) can store data values for feature components associated with investor confidence. As an example, the data values in database B 140B can be associated with upside, and combined credit rank for sector. Database C 140c (e.g., the Country Risk Ranking database) can store data values for feature components associated with risk. As an example, the data values in database C 140c operational risk. Database D 140d (e.g., the Value Chains database) can store data values for feature components associated with resilience. As an example, the data values in database D 140d can be associated with number of suppliers. Database E 140e (e.g., the Monitor Suite™ database) can store data values for feature components associated with legal issues and innovation. As an example, the data values stored in database E 140e can be associated with number of litigations and/or cases in which an entity is a named defendant. Additionally, the data values stored in Database E 140e can be associated with average number of patents granted per year and a patent grants to application ratio. Database F 140f (e.g., the ESG database) can store data values for feature components associated with environmental issues. As an example, the database F 140f can store data values associated with Thomson Reuters® ESG controversies category score. Database G 140g (e.g., News Analytics database) can store data values for feature components associated with public perception of the entity. As an example, database G 140g can store data values associated with news sentiment about an entity.

As described above, the feature components can be derived and/or calculated based on data values extracted from the data sources 105. As an example, the Leverage feature component can be calculated based on the following function: Leverage=NetDebt/Earnings Before Interest, Taxes, Depreciation, and Amortization (EBITDA). The data values such as NetDebt and EBITDA can be retrieved from the data sources 105 and can be used by the application to calculate Leverage. The Asset Worth feature component can be calculated based on the following function: AssetWorth=TotalAssets−TotalLiabilities. The data values such as TotalAssets and TotalLiabilities can be retrieved from the data sources 105 and can be used by the application to calculate AssetWorth. The Free Cash Flow Per Employee feature component can be calculated based on the following function: FreeCashFlowPerEmployee=FreeCashFlow/ NumberOfEmployees. The data values such as FreeCashFlow and NumberOfEmployees can be retrieved from the data sources 105 and can be used to calculate FreeCashFlowPerEmployee.

The Number of Suppliers feature component can be extracted from and/or obtained from a Knowledge Graph repository, such as CM-Well™ from Thomson Reuters®. The application 155 can extract data values associated with the number of suppliers for suppliers with a confidence value of greater than a specified threshold amount (e.g., 0.2). The Risk Factors feature component can be calculated by initially extracting the countries of risk factors from a system, such as Data Cloud. The following query can be executed on Data Cloud: TR.CoRFraction. The query can be executed for each entity in each of the subsets. The query can return a fractional exposure to the each entity's comparison against a specified amount (e.g., top 10) of the risk of other entities based on a StarMine® Countries of Risk Model. The StarMine® Countries of Risk Model relies on revenue distribution by geography, a location of entities' home offices, a country where the entities' primary security listing trades, and financial reporting currency. Subsequently, the application 155 can calculate risk factors for each country from data values extracted from and/or obtained from the Country Risk Ranking (i.e., database C 140c), which provides a risk index for each country. The application can use two sets of risk indices per country—a first set which is based on comprehensive risk (using the default Country Risk Ranking weights), and a second set which is based on operational risk (using modified weights to only include operational type tasks (e.g., management)).

The News Sentiment Analysis feature component can be extracted from the News Analytics (i.e., database 140g). The news articles can be grouped by entity (i.e., PermId®) and an overall sentiment can be calculated using the following function: $x_{overall} = x_{positive} - x_{negative}$, where x corresponds to the sentiment of the entity, e.g., positive sentiment, negative sentiment, and/or overall sentiment.

The Patent content feature component can be extracted from a backend database that powers Monitor Suite™ (i.e., database E 140e). Monitor Suite™ can aggregate legal information, entity data, and monitor dockets, highly graphical interface. As described above, the data values stored in Monitor Suite™ can be associated with a number of litigations, cases in which an entity is a named defendant, average patents granted per year, and a patent granted to application ratio. The application 155 can be executed to create a view that contains the number of patents filed and granted per entity over a specified amount of years. The application 155 can be executed to differentiate between the patents filed and patents granted.

The Litigation Content feature component can be extracted from backend database that powers Monitor Suite™ (i.e., database E 140e). The application 155 can be executed to specifically search for instances in which the entity acted as a defendant. The Return on Investment Capital feature component can be calculated as follows: ROIC=OperatingIncome*

$$\frac{1.0 - (IncomeTaxRatePercent/100)}{LongTermDebt + TotalEquity}.$$

The application 155 can transform and normalize the feature components for each entity in each subset. The transformations and normalizations are described in further detail with respect to FIG. 2. The application 155 can be executed to identify one or more feature components which the application 155 failed to extract and/or calculate based on the data values extracted from the data sources 105, for each entity. The application 155 can use the normalized feature components and the identified one or more feature components for which the application 155 failed to extract and/or calculate based on the data values extracted from the data sources 105, to implement a Bayesian Regression Model to calculate a raw score for each entity in each subset. The Bayesian Regression Model can implement Bayesian inference to infer a score for each entity by: computing a statistical probability for a possible set of values for one or more feature components for which the application 155 failed to extract, derive, and/or calculate based on the data values extracted from the data sources 105, identifying a value from the possible set of values with the highest statistical probability for each feature component for which the application 155 failed to extract, derive, and/or calculate, and generating the raw score for each entity in each of the subset of entities based on normalized values and identified values of each feature component for which the application 155 had failed to extract, derive, and/or calculate. Bayesian inference is a method of statistical inference that uses Bayes theorem to compute the joint probability distribution of a statistical model's parameters, conditional on the observed empirical evidence. The Bayesian Regression Model is described in further detail with respect to FIG. 2.

The application 155 can be executed to derive an expected quantile for each entity of each subset, based on the raw score for each entity. The application 155 can be executed to rank each entity of each subset according to the expected quantile for each entity. The application 155 can be executed to rank each entity in comparison to the other entities in the subset. Additionally, the application 155 can be executed to rank each entity in comparison to each other entity in each subset. As an example, application 155 can be executed to generate a list in descending order, including each entity of each subset, based on their rank (e.g., top 100 entities). Alternatively, or in addition to, the application 155 can be executed to generate a list in descending order, including each entity in an individual subset, based on their rank (e.g., top 25 entities of a specified classification). Alternatively, or in addition to, the application 155 can be executed to generate a list in descending order, including each entity in a further subset, based on their rank (e.g., top 25 entities of a specified sub-classification). The application 155 can be executed to generate visualizations to illustrate the rankings of the entities. The visualizations can include distribution charts, gauge charts, and/or pie charts illustrating the normalized value of each extracted/calculated feature components, and/or a descending list of entities based on their ranks. The application 155 can transmit the visualizations to the user device 170. The user device can render the visualizations in the GUI 180 on the display 175.

Figure 2:
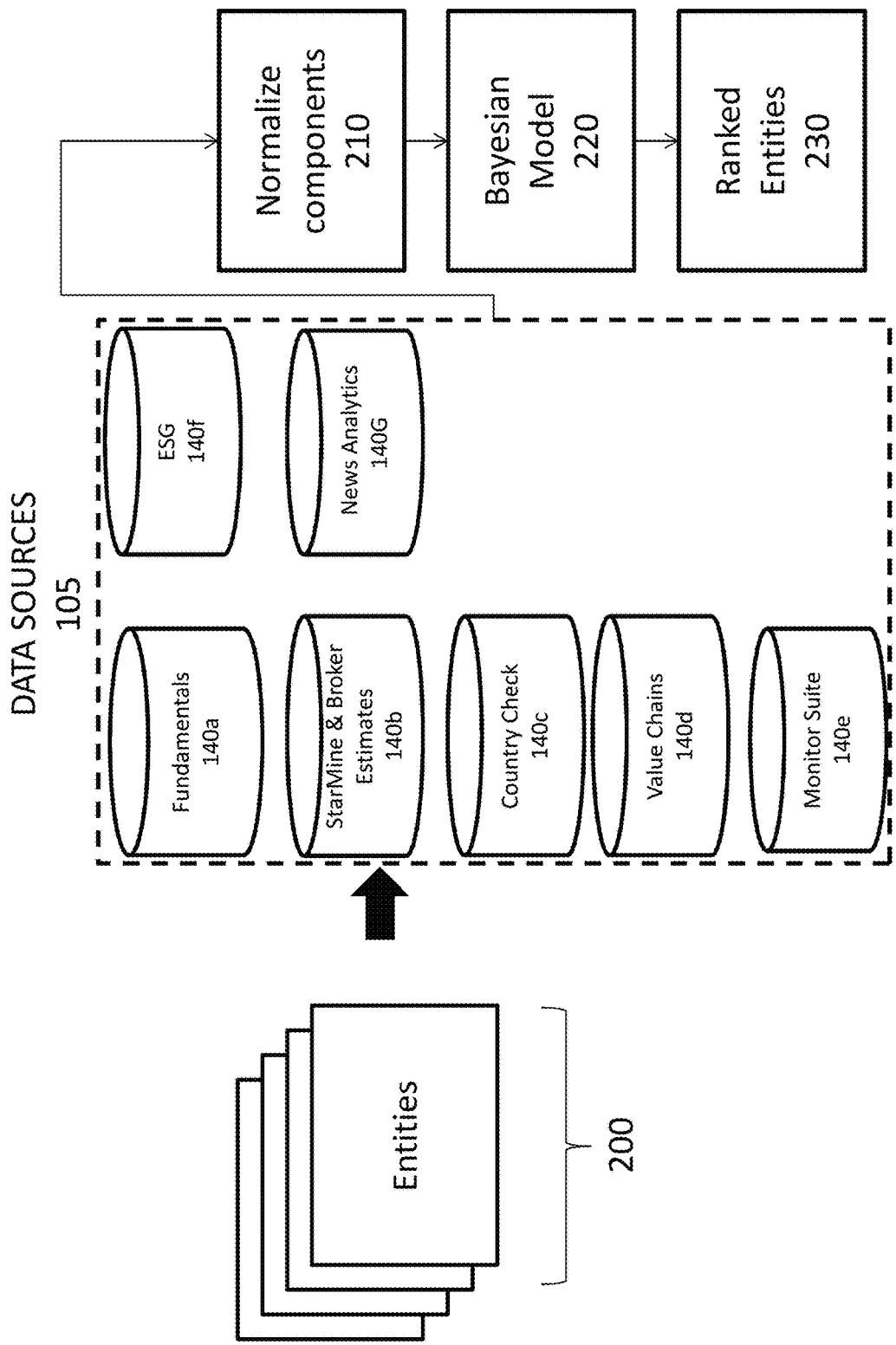
FIG. 2 illustrates a systematic method for ranking entities in accordance with an exemplary embodiment.

FIG. 2 illustrates the systematic method for ranking entities in accordance with an exemplary embodiment. As described above, the subsets of entities 200 can be analyzed against the data sources 105. The data sources 105 can include a Fundamentals database 140a (e.g., database A as shown in FIG. 1), a StarMine® & Broker Estimates database 140b (e.g., database B as shown in FIG. 1), a Country Risk Ranking database 140c (e.g., database C as shown in FIG. 1), a Value Chains database 140d (e.g., database D as shown in FIG. 1), a Monitor Suite™ database 140e (e.g., database E as shown in FIG. 1), a ESG database 140f (e.g., database F as shown in FIG. 1), a News Analytics database 140g (e.g., database G as shown in FIG. 1). The databases 140a-g, can be proprietary databases. Data values used to extract, derive, and/or calculate the feature components associated with each entity can be retrieved from the data sources 105.

In block 210, the extracted, derived, and/or calculated feature components can be transformed and normalized according to their meaning, to make them compatible with the Bayesian Regression Model. The range of admissible values can differ for each feature component. For example, market capitalization ranges from 0 to $+\infty$, while the 52-week price change ranges from $-\infty$ to $+\infty$. Each extracted, derived, and/or calculated feature component can be transformed using a bijective function, such that the transformed value ranges from $-\infty$ to $+\infty$, with high (positive) values being more desirable than low (negative) ones. Therefore, an implicit assumption is made, such that a transformation exists for each feature component of interest.

In one example, if a feature component y is unbounded (i.e., takes values from $-\infty$ to $+\infty$), then if $+\infty$ is the best value, and $-\infty$ is the worst one, the feature component can be used as is. Alternatively, if $-\infty$ is the best value, and $+\infty$ is the worst value, the feature component can be transformed $y \mapsto -y$. Alternatively, if the best value is some finite value, $y_0$ and $\pm\infty$ are the worst values, or vice versa, the feature component can be transformed using $y \mapsto |y-y_0|$.

If the feature component y is bounded from below, (i.e., it takes values between some finite value $y_0$ and $+\infty$, the feature component can be transformed using $y \mapsto y-y_0$, followed by $$y \mapsto \log\frac{y}{\hat{y}}$$

where $\hat{y}$ is me sample average of y. This makes the transformed feature component unbounded.

If the feature component y is bounded from above and below (i.e., it ranges between to finite values $y_1$ and $y_2$) and the two extreme values are the best and worst values, then the feature component can be transformed using $$y \mapsto \frac{y - y_1}{y_2 - y_1}$$

followed by $$y \mapsto \log\frac{y}{1 \ldots y};$$

this makes the feature component unbounded.

As an example, the leverage feature component can be transformed using $\vec{x}=-\vec{x}$. The Revenue 3 year growth feature component can be transformed using the following bounds: [0, inf] $\vec{x}=\vec{x}+100$. The Revenue 3 year growth feature component can then be normalized using $$\log\left(\frac{\vec{x}}{\mu_{\vec{x}}}\right).$$

The Number of Suppliers, Number of Customers, Patent Grants to Patent Applications Ratio, Average Patent Grants per Year feature components can be transformed and normalized using $$\vec{x} = \log\left(\frac{\vec{x}}{\mu_{\vec{x}}}\right).$$

The Average Litigations per Years feature component can be transformed and normalized using $$\vec{x} = -\log\left(\frac{\vec{x}}{\mu_{\vec{x}}}\right).$$

The Combined Alpha Model (CAM), Combined Credit Rank (CCR) feature components can be transformed using $$\vec{x} = \frac{\vec{x}}{100}.$$

Subsequently, the Combined Alpha Model, Combined Credit Rank can be normalized using $$\vec{x} = \log\frac{\vec{x}}{1-\vec{x}+\varepsilon},$$

where $\varepsilon \equiv 0.001$. Once all of those transformations have been applied, normalization is applied to every numerical feature (or component) with the following operation (to have zero mean and unit standard deviation):

$$\vec{x} = \frac{\vec{x} - \mu_{\vec{x}}}{\sigma_{\vec{x}}}.$$

It can be appreciated, that vector notation, $\vec{x}$, is used to indicate a vector of numbers, one for each entity (i.e., [1, 2, ..., n_entities]). The $\mu_{\vec{x}}$ can be used as the mean of $\vec{x}$ (as such, $$\mu_{\vec{x}} = \frac{1}{n}\sum_{i}^{n} x_i \bigg).$$

The $|\vec{x}|$ can be used as the absolute value of all the elements in $\vec{x}$, e.g., [abs(i) for i in x]. The =symbol can be used to define a quantity. It can also be appreciated one or more feature components may need to be transformed and/or normalized.

Bayes' Rule updates the statistical profanities of unknown data, based on new evidence as it becomes available. For example, initially unknown data can be one of three options, option A, option B, or option C. Using Bayes Rule, the application can be executed to initially determine that there is an 85% statistical probability that the unknown data is option A; there is an 10% statistical probability that the unknown data is option B; and there is an 5% statistical probability that the unknown data is option C. In a non-limiting example, based on new evidence, it may be determined that option A may be eliminated. In response to option A being eliminated, there is an 0% statistical probability that the unknown data is option A; there is now an 67% statistical probability that the unknown data is option B; and there is now an 33% statistical probability that the unknown data is option C. This process of going from the prior distribution (option A: 85%; option B: 10%; and option C: 5%) to a posterior distribution (option A: 0%; option B: 67%; and option C: 33%) can be referred to as the Bayesian update. In this regard, once the feature components are transformed and normalized, in block 220, the Bayesian Regression Model can be applied to the transformed and normalized values to generate a raw score for each entity based on the extracted, derived, and/or calculated feature components for an entity, as well as unidentified, unobservable, and/or latent feature components for the entity.

Each entity may have a score that is not directly observable. The unobservable score can be represented by x, in a Bayesian Regression Model, representing the 'excellence' of x. Each metric for an extracted, derived, calculated, and/or observable feature component of the entity is assumed to be a linear function of x plus noise: y=β*x+α+noise. Additionally, each data dimension (e.g., supply chain risk) has an associated sensitivity, $\beta_i$. The β's and x's can be estimated on the basis of the observable values of y for each entity.

As described above, in utilizing the Bayesian Regression Model, x can represent the value of the unidentified, unobservable, and/or latent feature component associated with an entity and $y_i$ and x are related through a constrained linear regression model:

$$y_i(x) = \beta_i x + \alpha_i + \in_i \quad (1)$$

$$\in_i \sim N(0, \sigma_i) \quad (2)$$

$$\beta_i \geq 0 \quad (3)$$

where $\alpha_i$, $\beta_i$, and $\sigma_i$ can be feature component specific parameters associated with feature component i. N (0, $\sigma_i$) is the normal distribution with zero mean and standard deviation $\sigma$, and $1 \leq i \leq F$. The constraints (equations 3) imply that an increase in x will produce a Pareto improvement in the vector of expectation values of the features (E[$f_1$], E[$f_2$], ..., E[$f_F$]), and vice versa. For example, entity A Pareto dominates entity B in expectation, if and only if A has a higher latent fitness value x (i.e., latent feature components) than B.

The constrained linear regression model includes a single independent variable, x, and multiple dependent variables $y_i$. The dependent variables can be measured and the value of the independent variables can be inferred from empirical data. The Bayesian inference can be applied to infer the independent variable. Using Equations 1-3, the probability of the extracted, derived and/or calculated feature components can be written as follows:

$$P\big(\{y_{i_k j_k}\}_{k=1}^{O}\big) = \quad (4a)$$

$$\prod_{k=1}^{O} P_N(y_{i_k j_k} \mid \mu_{i_k j_k}, \sigma_{i_k}) \times \left(\prod_{i=1}^{F} P(\alpha_i, \beta_i, \sigma_i) \times P\big(\{x_j\}_{j=1}^{N}\big)\right)$$

$$\mu_{i_k j_k} = \beta_{i_k} x_{j_k} + \alpha_{i_k} \quad (4b)$$

In equations 4a and 4b, the $i_k$ and the $j_k$ are respectively the feature component and the entity observed in observation k and $P_N$ is the probability of the density of the normal distribution. Uniform priors for the regression parameters and fitness variables can be assumed. As a non-limiting example, a Hamiltonian Markov chain Monte Carlo sampler can be used to sample posterior distribution of all the fitness variables.

$$P\big(\{x_j\}_{j=1}^{N} \mid \{y_{i_k j_k}\}_{k=1}^{O}\big) \quad (5)$$

Equation 5, produces a sample $\{x_m\}_{m=1}^{M}$, where each $x_m = (x_{m1}, x_{m2}, ..., x_{mN})$ is a complete fitness vector for a universe of entities under consideration (i.e., each entity in each subset). For each such vector a quantile vector (e.g., quantile as described with respect to FIG. 1) can be computed. The quantile vector $q_m = (q_{m1}, q_{m2}, ..., q_{mN})$ can be defined by:

$$q_{mi} = \frac{1}{N} |\{j \mid \leq j \leq N, x_{mj} \leq x_{mi}\}| \quad (6)$$

The final score vector (e.g., the raw score for the entity as described with respect to FIG. 1), is defined to be the vector of expectation values for these quantiles, $z=(z_1, z_2, \ldots, z_N)$, as estimated from the sample:

$$z_i = \hat{q}_i \equiv \frac{1}{M} \sum_{m=1}^{M} q_{mi} \quad (7)$$

An expected quantile can be calculated for each entity based on a calculated raw score from the Bayesian Regression Model. In block 230, the entity can be ranked based on the expected quantile. It can be appreciated, the entities can be one or more of: corporations, partnerships, educational institutions, governmental institutions, organizations, and/or other organized groups which can be defined as entities. The classifications can be industries and sub industries of the entities (i.e., energy, telecommunications, agricultural, transportation, construction, etc. . . . ).

Figure 3:
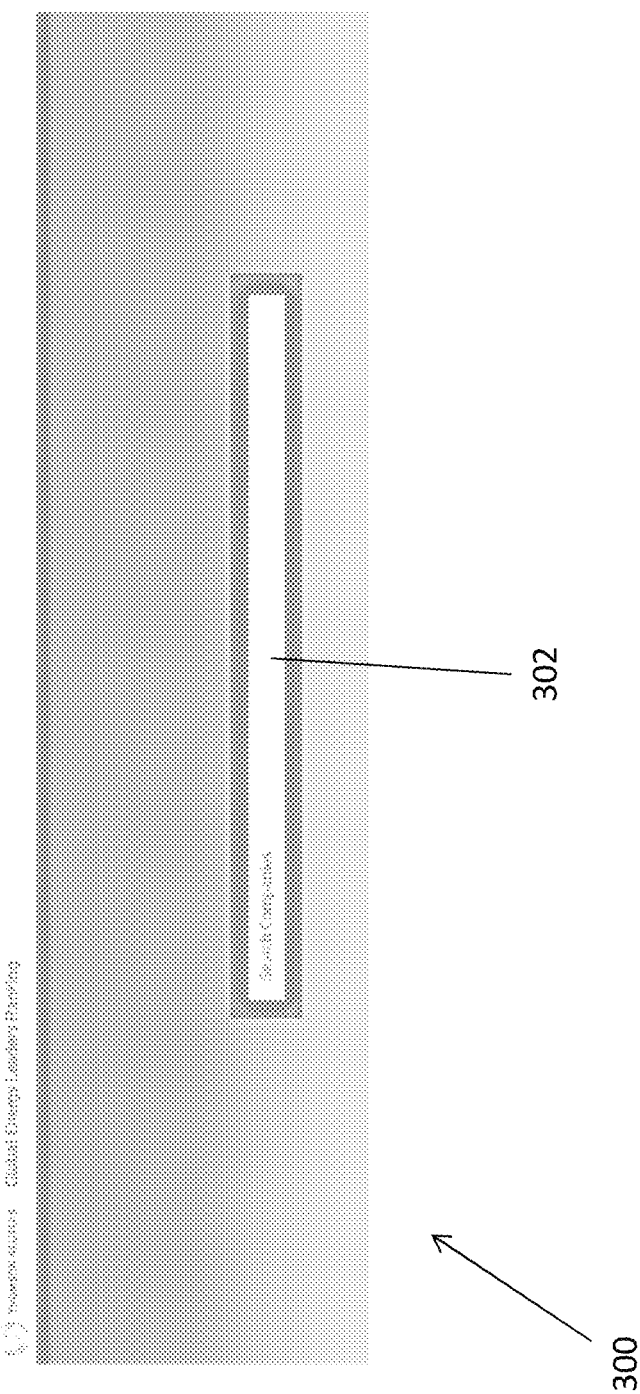
FIGS. 3-8 illustrate exemplary Graphical User Interfaces (GUIs) in accordance with an exemplary embodiment.

FIGS. 3-8 illustrate exemplary Graphical User Interfaces (GUI) in accordance with an exemplary embodiment. With reference to FIG. 3, in response to executing the application (e.g., application 155 as shown in FIG. 1) on the computing system or user device (e.g., computing system 150 or user device 170 as shown in FIG. 1), the display (e.g., display 175 as shown in FIG. 1) can render a search screen 300 in the GUI (e.g., GUI 180 as shown on FIG. 1). The search screen 300 can include a query box 302. The query box 302 receives input in the form of alphanumeric text associated with an entity. A user can enter an entity name and/or identifier associated with the entity, in the query box, to compare the entity within a universe of other entities, via a visualization module. In response to searching the entity, entities can be displayed based on their final ranked score (calculated as described herein).

Figure 4:
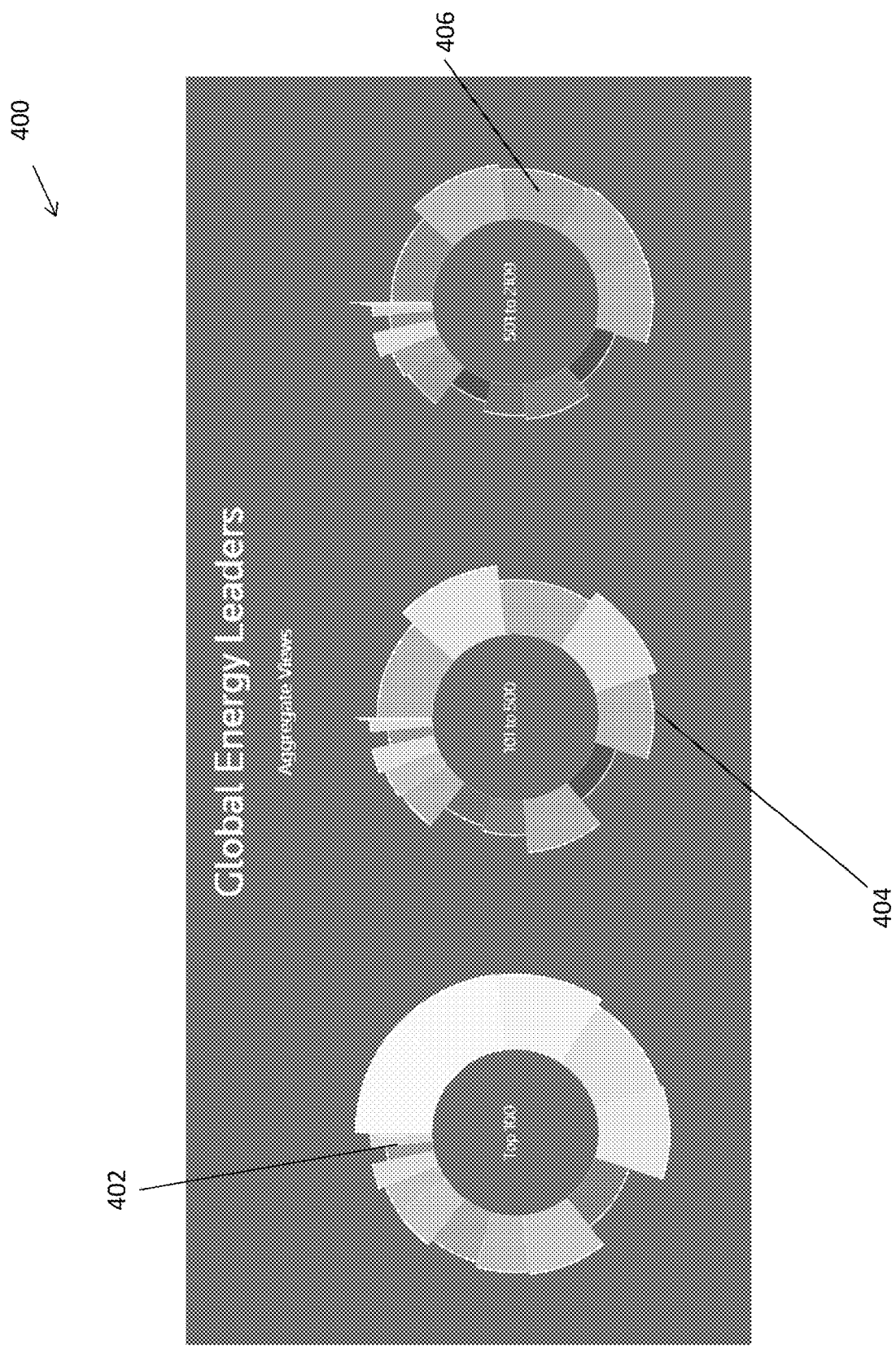

With reference to FIG. 4, an aggregate view 400 can be rendered in the GUI on the display. The aggregate view 400 can include pie charts 402-406 illustrating top 100, top 101-500, and top 500-2109, entities in a specific classification (e.g., global energy), respectively. Each of the pie charts 402-406 can include various portions, and each portion can represent an entity. The size of the portion can represent the ranking for each entity. For example, the larger the portion, the higher the ranking of the entity, or the smaller the portion, the lower the ranking.

Figure 5A:
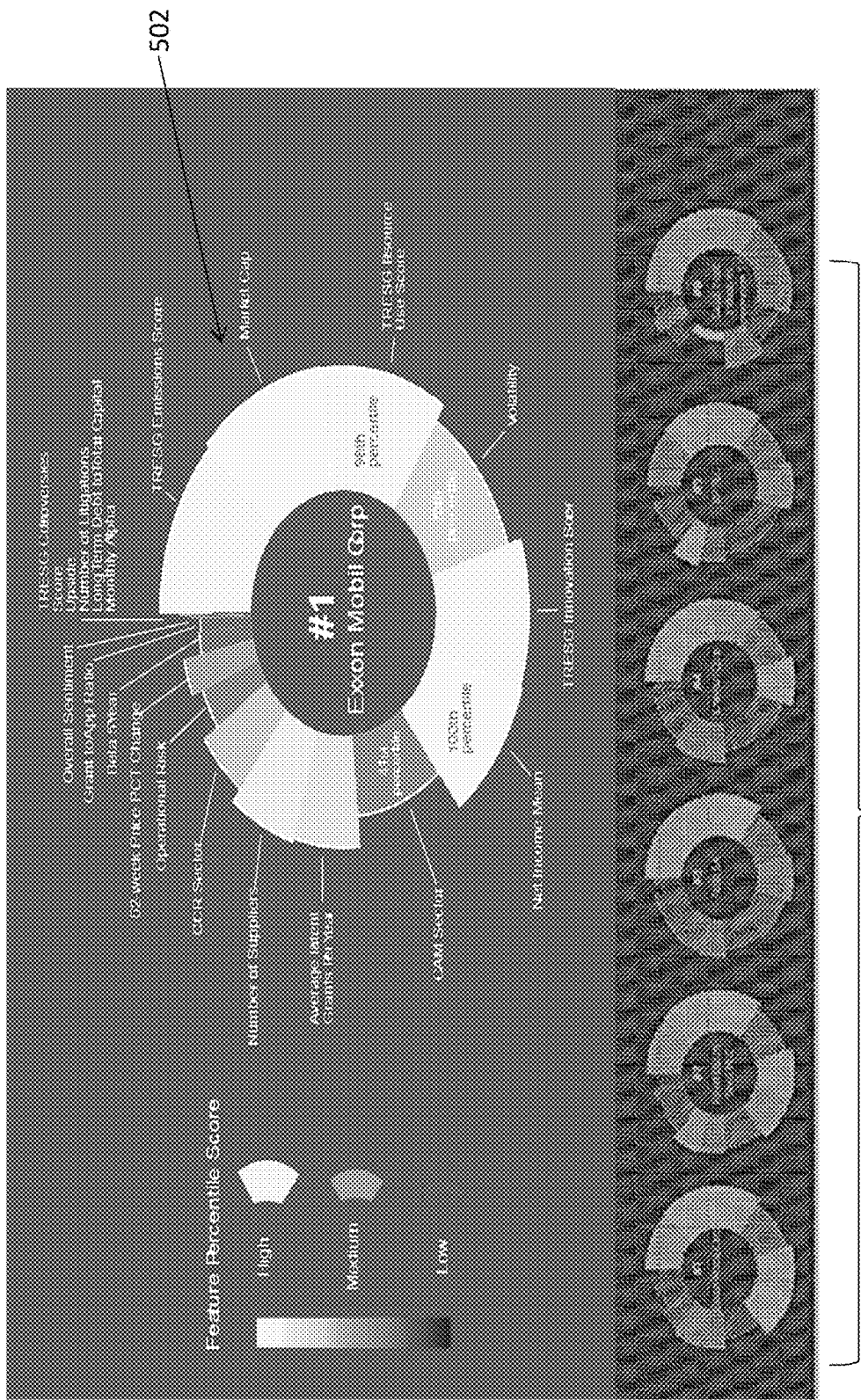
Figure 5B:
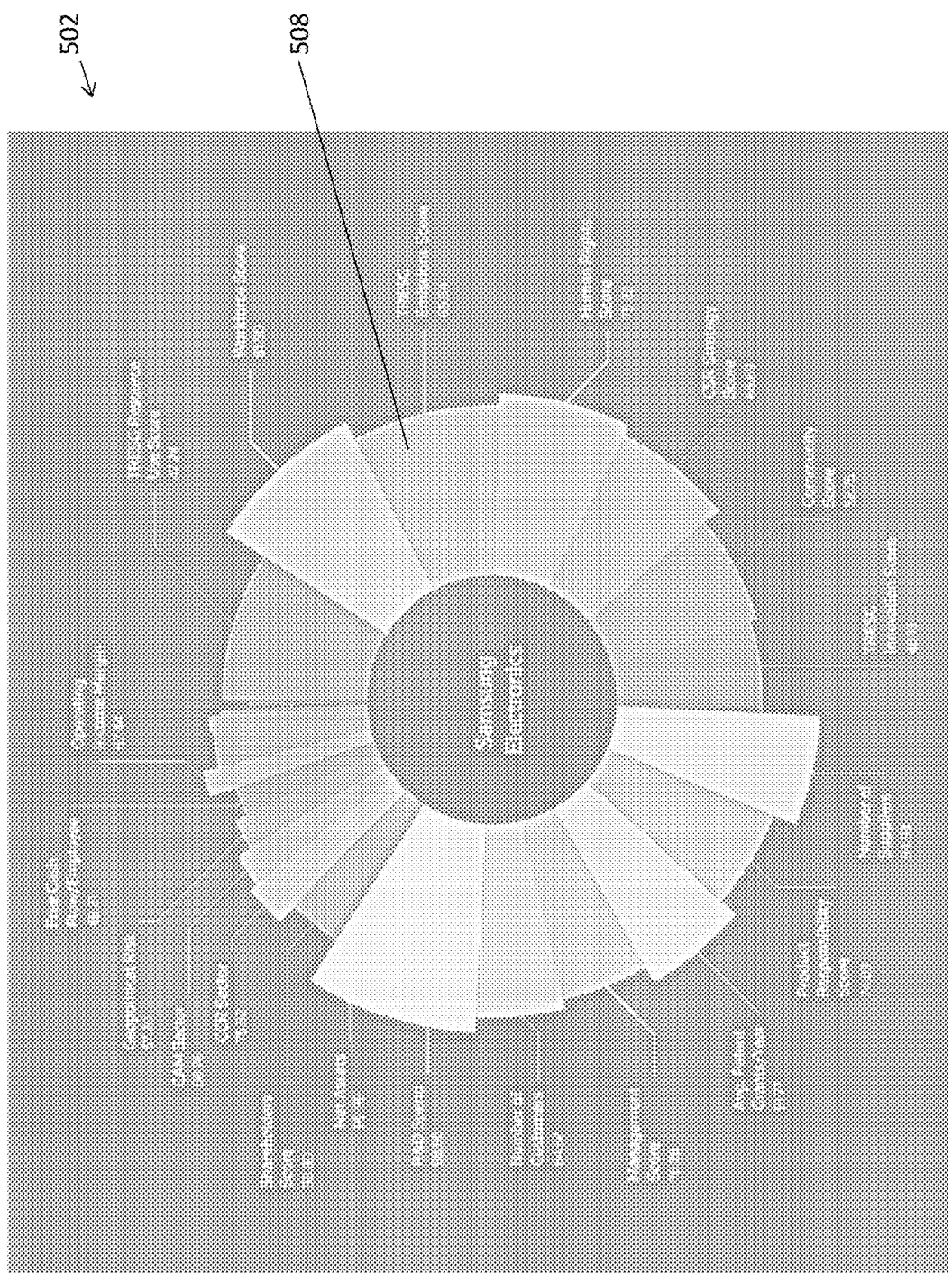

With reference to FIG. 5A, a visualization of individual feature components 500 can be rendered in the GUI on the display. The visualization of individual feature components 500 can include a pie chart 502 of the selected entity. With reference to FIG. 5B, the pie chart 502 can include different portions 508. Each portion 508 can represent a different feature component for the entity. The numerical score and/or percentile of each feature component can also be displayed. The numerical score and/or percentile can indicate the percentile rank for each feature component of the selected entity, as it compares to other entities. The size of the portions 508 can represent the weight of the feature component when calculating the final raw score, and/or the numerical score and/or percentile of the feature component (i.e., the larger the weight the larger the portion, and/or the larger the numerical score/percentile the larger the portion). Each portion 508 can be filled with different patterns and/or color coded. For example, a specific pattern and/or color can indicate, the feature component of the entity was in a high percentile, medium percentile, or a low percentile, as compared to other entities.

Turning back to FIG. 5A, the visualization of individual feature components 500 can also include a selection of pie charts 504 of various entities rendered below the pie chart 502. The pie chart 502 can be larger than the selection of pie charts 504. The pie chart of the selection of pie charts 504 can be selected to be enlarged. In response to selecting a pie chart from the selection of the pie charts 504, the pie chart 502 can be replaced by the newly selected pie chart.

Figure 6:
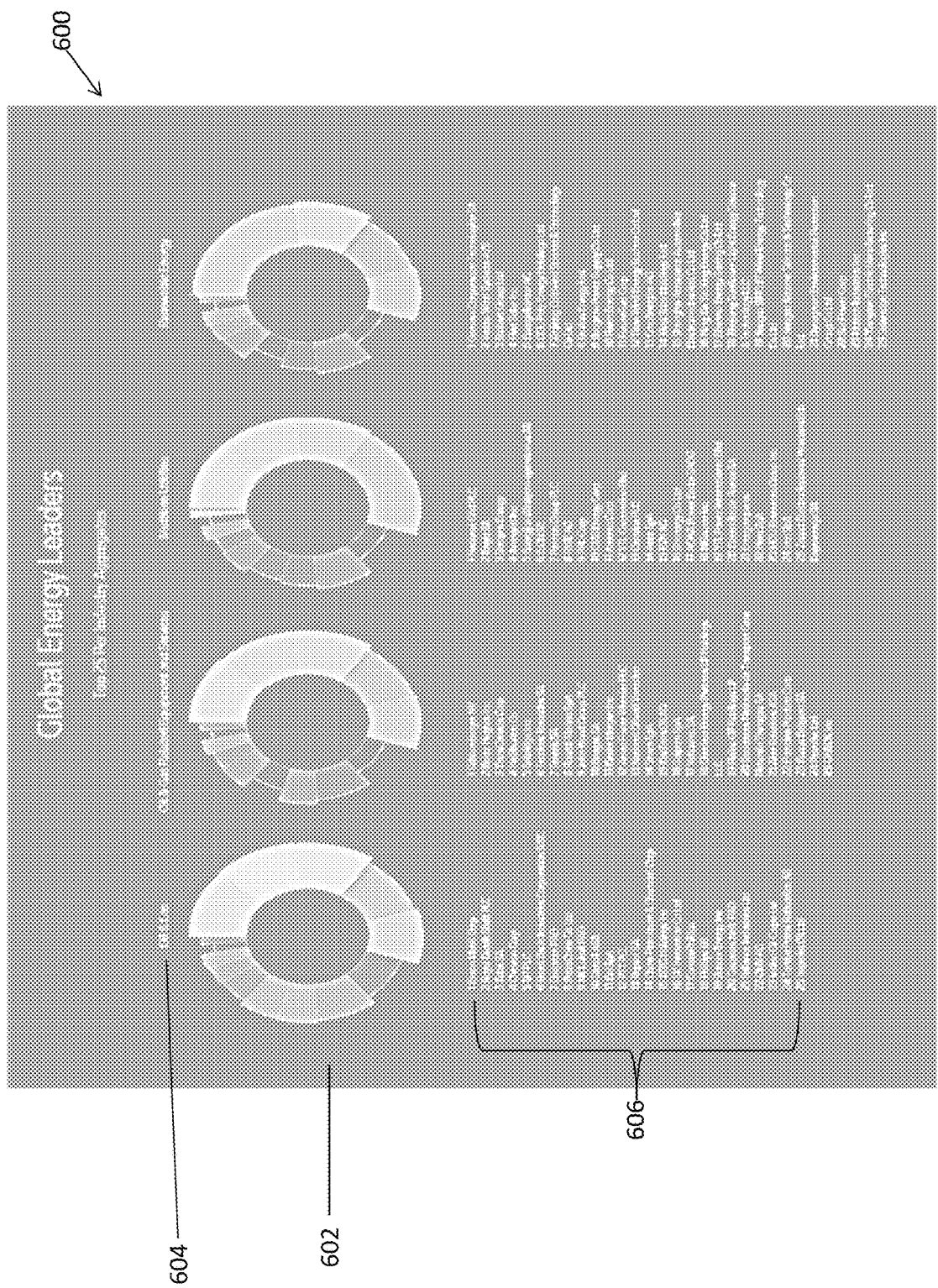

With reference to FIG. 6, aggregate views 600 including multiple pie charts 602 based on different classification 604 (and sub classifications) of entities (i.e., Oil & Gas, Oil & Gas Related Equipment and Services, Multiline Utilities, Renewable Energy) can be rendered in the GUI on the display. The pie charts 602 can be disposed adjacent to one another. Each of the pie chart can include various portions, and each portion can represent an entity. The size of the portion can represent the ranking for each entity. For example, the larger the portion, the higher the ranking of the entity, or the smaller the portion, the lower the ranking. A listing of the entities 606 included in each of the pie chart can be rendered in descending order based on the rank of the entity, below the respective pie chart.

Figure 7:
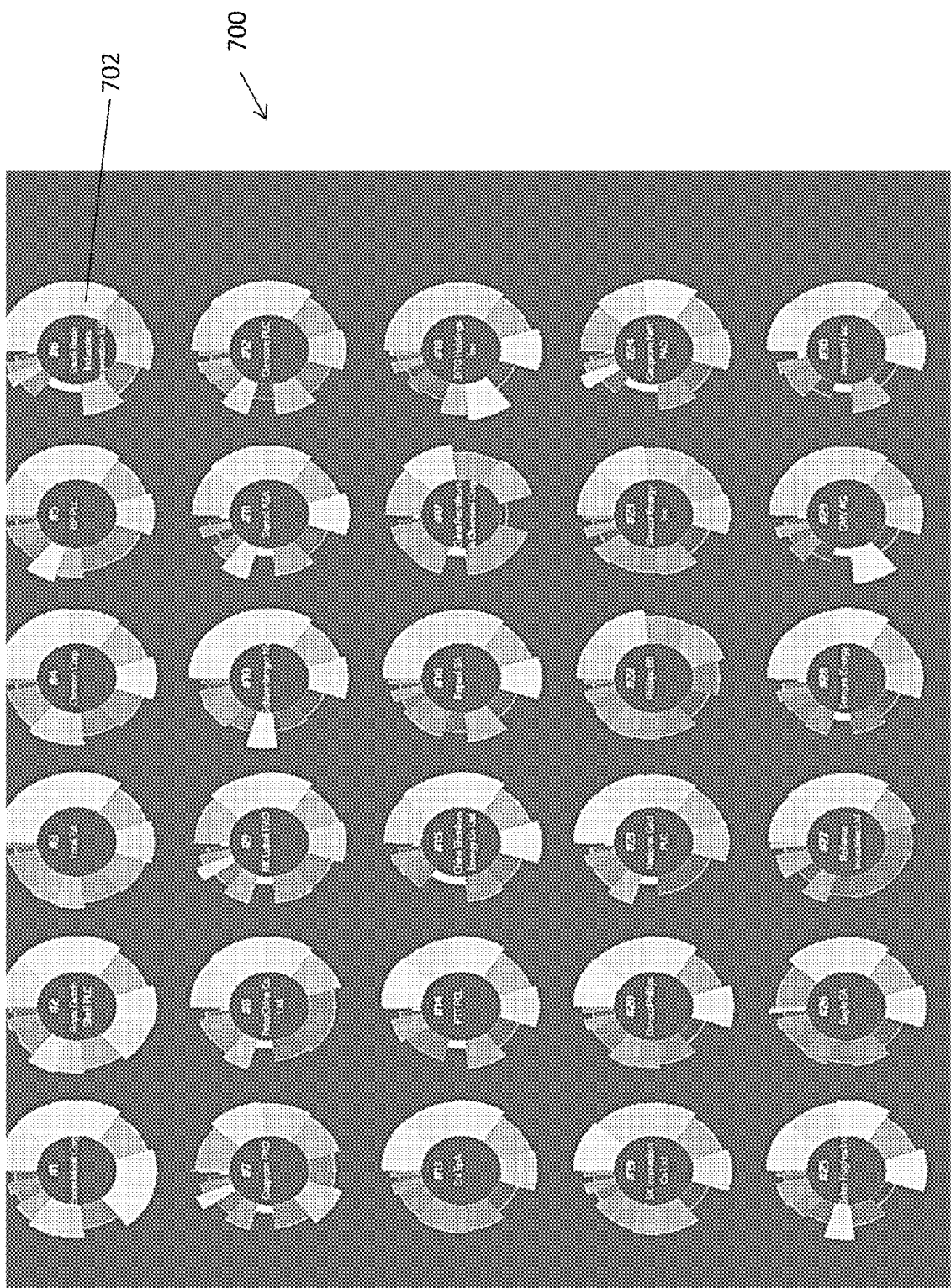

With reference to FIG. 7, a multiple pie chart view 700 can be rendered in the GUI on the display. The multiple pie chart view can include multiple pie charts 702 of various entities. The pie charts can breakdown the numerical scores and/or percentiles of each feature component of the entity. Each of the pie charts 702 can be selected for an enlarged view. The order of the pie charts can represent the ranking of the entity. The rankings can increase left to right. For example, the entity associated with the pie chart rendered on the far left corner of the multiple pie chart view 700 may be ranked number 1 and the rankings may increase sequentially for each pie chart rendered to the right.

Figure 8:
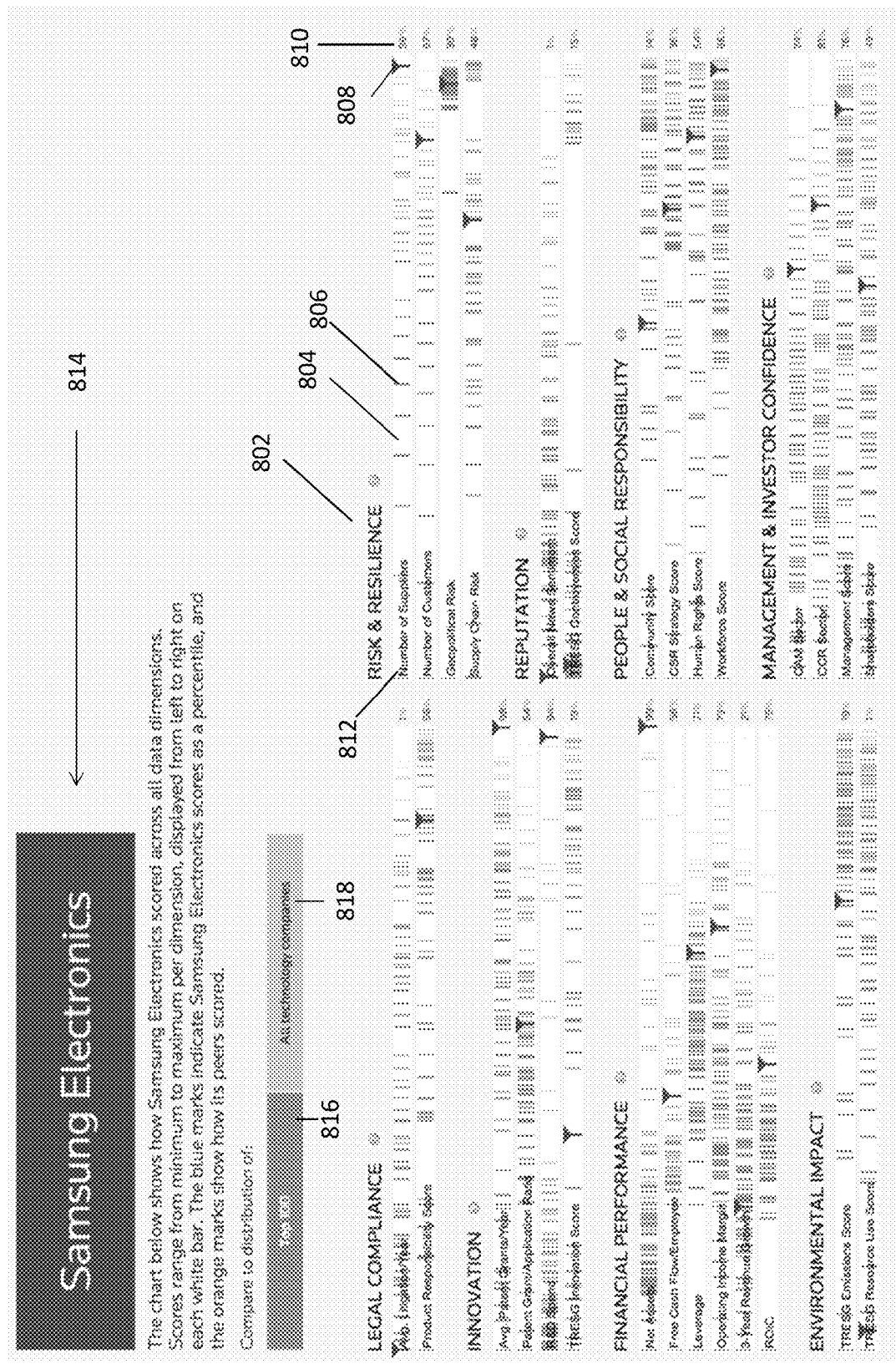

With reference to FIG. 8, a distribution chart view 800 can be rendered in the GUI on the display. The distribution chart view 800 can be specific to a selected entity. The entity name 814 can be displayed on the top left. A selection of top 100 816 entities or a classification of entities 818 can be displayed below the entity name 814. The distribution chart view 800 can include an analysis of multiple categories (pillars) 802. As an example, the categories can include, risk & resilience, reputation, people & social responsibility, management & investor confidence, legal compliance, innovation, financial performance, and environmental impact. Each category 802 can include an analysis for multiple dimensions (e.g., feature components) 812. As an example, the risk & resilience category can include one or more of the following dimensions: number of suppliers, number of customers, geopolitical risk, and supply chain risk. The reputation category can include one or more of the following dimensions: overall news sentiment, TR ESG controversies score. The people & social responsibility category can include one or more of the following dimensions: community score, CSR strategy score, human rights score, and workforce score. The management & investor category can include one or more of the following dimensions: CAM sector, CCR sector, management sector, shareholders sector. The legal compliance category can include one or more of the following dimensions: average litigations per year, and product responsibility score. The innovation category can include one or more of the following dimensions: average patents granted per year, a patent grant to application ratio, R & D spending, TR ESG innovation score. The financial performance category can include one or more of the following dimensions: net assets, free cash flow per employee, leverage, operating income margin, 3-year revenue growth, Return On Invested Capital (ROIC). The environmental impact category can include one or more of the following dimensions: TR ESG emissions score, TR ESG resource use score.

Each analysis of the dimension can include a horizontal bar 1004. Each distribution in the horizontal bar 804, is displayed under the category 802. The horizontal bar 804 can include a distribution analysis of each dimension. The distribution in the horizontal bar 804 can indicate the entity's score and/or percentile for the specific dimension 812, respective to other entities. In response to the selection of the top 100 entities 816, the distribution chart view 800 can render distribution in a horizontal bar 804 for each dimension 812 for the specific entity with respect to the top 100 entities. The top 100 entities can be entities with the top 100 scores for the respective feature components. Alternatively, or in addition to, the top 100 entities can be the top 100 overall ranked entities. In response to classification of entities 818, the distribution chart view 800 can render distribution in a horizontal bar 804 for each dimension 812 for the specific entity with respect to the other entities of the classification of the specific entity.

The distributions in the horizontal bar 804 can represent scores for the entities for the specific feature components. The scores can range from minimum to maximum per dimension, displayed from left to right in the horizontal bar 804. Each line 806 in the horizontal bar 804 can represent the scores of other entities. The funnel shaped symbol 808 can indicate the score of the specific entity. A numerical percentile (i.e., score) 810 for the specific entity for the feature component can be rendered adjacent to the right of the horizontal bar 804.

Figure 9:
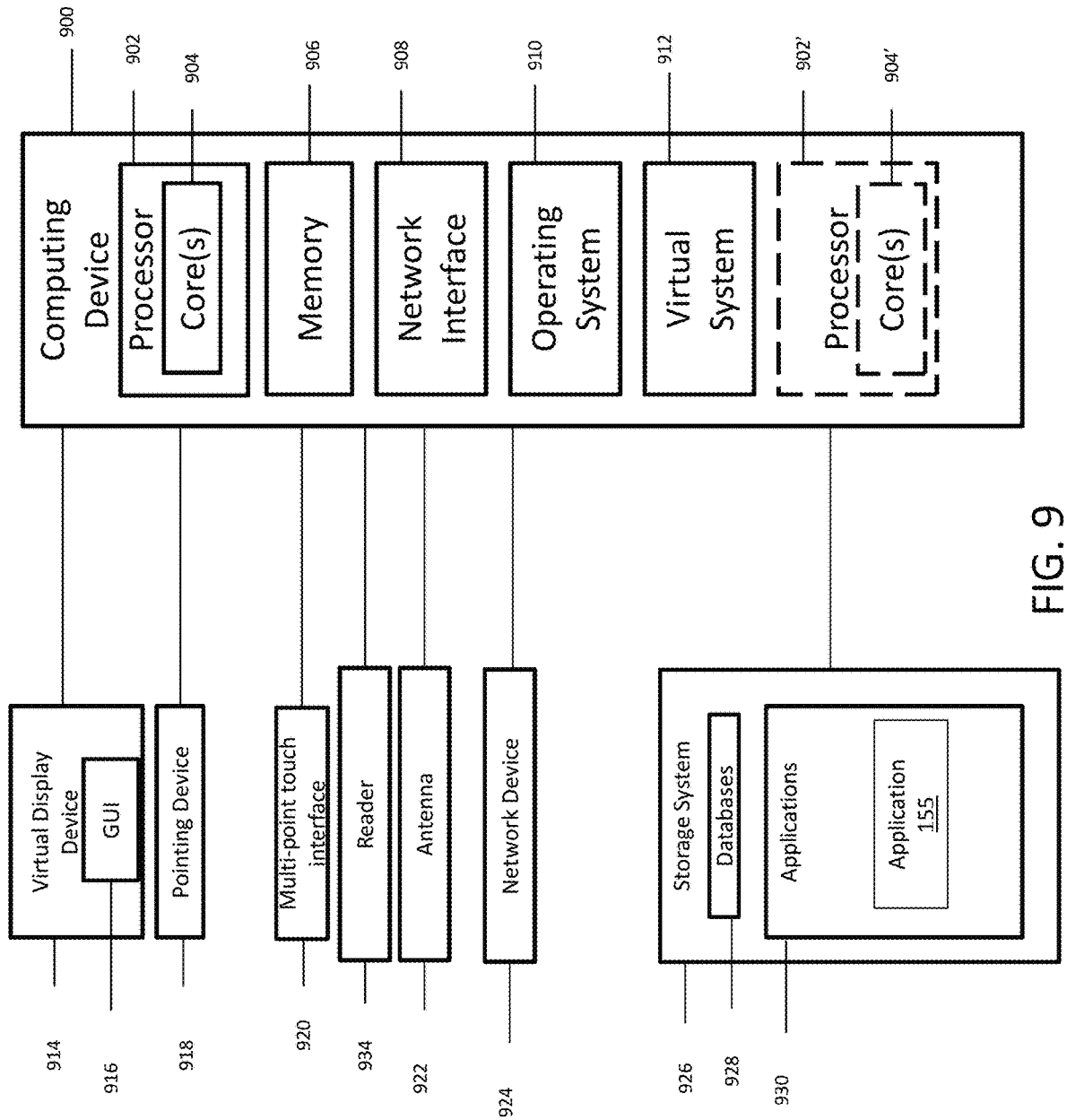
FIG. 9 illustrates a computing device in accordance with an exemplary embodiment.

FIG. 9 is a block diagram of an example computing device for implementing exemplary embodiments. The computing device 900 may be, but is not limited to, a smartphone, laptop, tablet, desktop computer, server or network appliance. The computing device 900 can be embodied as part of the computing system, user device and/or domains. The computing device 900 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 906 included in the computing device 900 may store computer-readable and computer-executable instructions or software (e.g., applications 930 such as the application 155) for implementing exemplary operations of the computing device 900. The computing device 900 also includes configurable and/or programmable processor 902 and associated core(s) 904, and optionally, one or more additional configurable and/or programmable processor(s) 902' and associated core(s) 904' (for example, in the case of computer systems having multiple processors/cores), for executing computer-readable and computer-executable instructions or software stored in the memory 906 and other programs for implementing exemplary embodiments. Processor 902 and processor(s) 902' may each be a single core processor or multiple core (904 and 904') processor. Either or both of processor 902 and processor(s) 902' may be configured to execute one or more of the instructions described in connection with computing device 900.

Virtualization may be employed in the computing device 900 so that infrastructure and resources in the computing device 900 may be shared dynamically. A virtual system 912 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

A user may interact with the computing device 900 through a visual display device 914, such as a computer monitor, which may display one or more graphical user interfaces 916, multi touch interface 920, and a pointing device 918.

The computing device 900 may also include one or more storage devices 926, such as a hard-drive, CD-ROM, or other computer readable media, for storing data and computer-readable instructions and/or software that implement exemplary embodiments (e.g., applications i.e. the application 155). For example, exemplary storage device 926 can include one or more databases 928 for storing data values for feature components associated with entities. The databases 928 may be updated manually or automatically at any suitable time to add, delete, and/or update one or more data items in the databases.

The computing device 900 can include a network interface 908 configured to interface via one or more network devices 924 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 922 to facilitate wireless communication (e.g., via the network interface) between the computing device 900 and a network and/or between the computing device 900 and other computing devices. The network interface 908 may include a built-in network adapter, network interface card, PCMCIA network card, card bus network adapter, wireless network adapter, USB network adapter, modem or any other device suitable for interfacing the computing device 900 to any type of network capable of communication and performing the operations described herein.

The computing device 900 may run operating system 910, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 900 and performing the operations described herein. In exemplary embodiments, the operating system 910 may be run in native mode or emulated mode. In an exemplary embodiment, the operating system 910 may be run on one or more cloud machine instances.

FIG. 10 is a flowchart illustrating an exemplary process performed in the entity ranking system. In operation 1000, a computing system (e.g., computing system 150 as shown in FIG. 1) in communication with one or more domains (e.g., domains A-N 112*a-n*), data sources (e.g., data sources 105 as shown in FIGS. 1 and 3) and one or more user computing devices (e.g., user devices 170 as shown in FIG. 1) in a networked environment, can interface with the one or more domains to identify a set of entities based on a taxonomy and a registry associated with the entities in the set. The data sources can store one or more databases (e.g., databases A-G 140a-g as shown in FIGS. 1 and 3) associated with entities. The computing system can host an application (e.g., application 155 as shown in FIG. 1). In operation 1002, the computing system can define subsets of entities from the set of entities based on classifications of the entities in the set. As an example, the entities can be divided into subsets and further subsets based on classification and sub classifications (e.g., classifications and sub classifications as shown in FIG. 6 604). In operation 1004, the computing system can query each subset of entities against one or more data sources from the plurality of data sources. In operation 1006, in response to querying the subset of entities against the one or more data sources, the computing system can ascertain a first set of data components for each entity in the subsets of entities from the one or more data sources. As described above, the first set of data components can be feature components extracted, derived, and/or calculated based on data values retrieved from the data sources.

In operation 1008, the computing system can normalize each of the first set of data components for each entity in the subsets of entities. As described above, the extracted feature components (data components) can be normalized according to their meaning, to make them compatible with a Bayesian Regression Model. In operation 1010, the computing system can detect a failure to ascertain a second set of data components. As described above, the second set of data components can be certain feature components which can be unknown and/or latent for certain entities. In operation 1012, the computing system can implement a Bayesian inference to infer a score for each entity by: computing a statistical probability for a possible set of values for each data component of the second set of data components based on the ascertained first set of data components, identifying, for each data component in the second set, a value from the possible set of values with the highest statistical probability, and generating the score for each entity in each of the subset of entities based on normalized values of the first set of data and identified values of the second set of data. In operation 1014, the computing system can derive a quantile for each entity based on the score. In operation 1016, the computing system can rank each entity based on the quantile.

In operation 1018, the computing system can generate a graphical user interface including a visualization (e.g., visualizations 300-800 as shown in FIGS. 3-8) of the ranking of each entity. In operation 1020, the computing system can transmit the graphical user interface to at least one of the user computing devices to render the graphical user interface on a display of the at least one of the user computing devices.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An entity ranking system, the system comprising:
a computing system comprising a processor in communication with, one or more domains, a plurality of data sources and one or more user computing devices in a networked environment, the plurality of data sources storing one or more databases associated with a plurality of entities, the computing system hosting an application, the computing system configured to:
interface with one or more domains to identify a set of entities based on a taxonomy and a registry associated with the entities in the set;
define subsets of entities from the set of entities based on classifications of the entities in the set;
query each subset of entities against one or more data sources from the plurality of data sources;
in response to querying the subset of entities against the one or more data sources, ascertain a first set of data components for each entity in the subsets of entities from the one or more data sources;
in response to determining an amount of data components in a first set of data components for a first entity is less than a threshold amount, remove the first entity from the set of entities;
transform each of the data components in the first set using a bijective function to normalize each of the first set of data components for each entity in the subsets of entities;
detect a failure to ascertain a second set of data components;
implement a Bayesian inference to infer a score for each entity by (i) computing a statistical probability for a possible set of values for each data component of the second set of data components based on the normalized first set of data components, (ii) identifying, for each data component in the second set, a value from the possible set of values with a highest statistical probability, and (iii) generating the score for each entity in each of the subset of entities based on normalized values of the first set of data and identified values of the second set of data components;
derive a quantile for each entity based on the score;
rank each entity based on the quantile;
generate a graphical user interface including a visualization of the ranking of each entity; and
transmit the graphical user interface to at least one of the user computing devices to render the graphical user interface on a display of the at least one of the user computing devices.

2. The system of claim 1, wherein the computing system is programmed to rank each entity with respect to each other entity in each subset.

3. The system of claim 1, wherein the computing system is programmed to rank each entity with respect to each other entity within the respective subset.

4. The system of claim 1, wherein the statistical probability for the possible set of values is computed using a Bayesian Regression Model.

5. The system of claim 4, wherein each of the normalized values of the first set of data components and the values of the second set of data components are assigned specified weights.

6. The system of claim 1, wherein the visualization includes one or more of a: pie chart, distribution chart, lists, and gauge charts.

7. The system of claim 1, wherein the computing system is programmed to receive an input associated with a selected entity of the set of entities, from the at least one user computing device.

8. The system of claim 7, wherein the visualization includes a first graphical representation of a score associated with the selected entity with respect to each entity in the set of entities and a second graphical representation of the score associated with the selected entity with respect to each entity in the subset of entities which includes the selected entity.

9. The system of claim 1, wherein the one or more user computing devices execute an instance of the application.

10. An entity ranking method, the method comprising:
interfacing, via a computing system in communication with, one or more domains, a plurality of data sources and one or more user computing devices in a networked environment, the plurality of data sources storing one or more databases associated with a plurality of entities, the computing system hosting an application, with the one or more domains to identify a set of entities based on a taxonomy and a registry associated with the entities in the set;
defining, via the computing system, subsets of entities from the set of entities based on classifications of the entities in the set;
querying, via the computing system, each subset of entities against one or more data sources from the plurality of data sources;
in response to querying the subset of entities against the one or more data sources, ascertaining, via the computing system, a first set of data components for each entity in the subsets of entities from the one or more data sources;
in response to determining an amount of data components in a first set of data components for a first entity is less than a threshold amount, removing, via the computing system, the first entity from the set of entities;
transforming, via the computing system, each of the data components in the first set using a bijective function to normalize each of the first set of data components for each entity in the subsets of entities;
detecting, via the computing system, a failure to ascertain a second set of data components;
implementing, via the computing system, a Bayesian inference to infer a score for each entity by (i) computing a statistical probability for a possible set of values for each data component of the second set of data components based on the normalized first set of data components, (ii) identifying, for each data component in the second set, a value from the possible set of values with a highest statistical probability, and (iii) generating the score for each entity in each of the subset of entities based on normalized values of the first set of data and identified values of the second set of data components;
deriving, via the computing system, a quantile for each entity based on the score;
ranking, via the computing system, each entity based on the quantile;
generating, via the computing system, a graphical user interface including a visualization of the ranking of each entity; and
transmitting, via the computing system, the graphical user interface to at least one of the user computing devices to render the graphical user interface on a display of the at least one of the user computing devices.

11. The method of claim 10, further comprising ranking, via the computing system, each entity with respect to each other entity in each subset.

12. The method of claim 10, further comprising ranking, via the computing system, each entity with respect to each other entity within the respective subset.

13. The method of claim 10, wherein the statistical probability for the possible set of values is computed using a Bayesian Regression Model.

14. The method of claim 13, wherein each of the normalized values of the first set of data components and the values of the second set of data components are assigned specified weights.

15. The method of claim 10, wherein the visualization includes one or more of: a pie chart, distribution, lists, and gauge charts.

16. The method of claim 10, further comprising receiving, via the computing system, an input associated with a selected entity of the set of entities, from the at least one user computing device.

17. The method of claim 16, wherein the visualization includes a first graphical representation of a score associated with the selected entity with respect to each entity in the set of entities and a second graphical representation of the score associated with the selected entity with respect to each entity in the subset of entities which includes the selected entity.

18. The method of claim 10, wherein the one or more user computing devices execute an instance of the application.

19. The system of claim 1, wherein the computing system configured to:
generate a fitness vector for each entity in each of the plurality of subsets of entities; and
generate a quantile vector for each fitness vector to derive the quantile for each entity based on the score.

20. The method of claim 10, further comprising:
generating a fitness vector for each entity in each of the plurality of subsets of entities; and
generating, via the computing system, a quantile vector for each fitness vector to derive the quantile for each entity based on the score.

* * * * *